(12) United States Patent
Hamann et al.

(10) Patent No.: US 6,825,633 B2
(45) Date of Patent: Nov. 30, 2004

(54) METHOD FOR ADAPTING JERK PROFILES THROUGH JERK LIMITATION FOR MINIMIZING EXCITATIONS OF OSCILLATIONS DURING MOVEMENT OF A MACHINE ELEMENT

(75) Inventors: Jens Hamann, Fürth (DE); Uwe Ladra, Erlangen (DE); Elmar Schäfers, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 103 days.

(21) Appl. No.: 10/340,862

(22) Filed: Jan. 10, 2003

(65) Prior Publication Data

US 2003/0155881 A1 Aug. 21, 2003

(30) Foreign Application Priority Data

Jan. 10, 2002 (DE) ......................................... 102 00 680

(51) Int. Cl.$^7$ ........................... G05B 19/416; G05B 7/00
(52) U.S. Cl. ...................... 318/600; 318/621; 318/629; 318/632
(58) Field of Search ........................... 318/566, 568.15, 318/568.22, 573, 600, 611, 621, 629, 632

(56) References Cited

U.S. PATENT DOCUMENTS 5,057,756 A * 10/1991 Hara ........................... 318/569
5,184,055 A * 2/1993 Ohishi et al. ................ 318/615
5,331,264 A    7/1994 Cheng
5,832,188 A * 11/1998 Papiernik ..................... 700/245
6,274,995 B1 * 8/2001 Kerner ........................ 318/611
6,469,467 B1 * 10/2002 Fujita .......................... 62/228.4
6,580,245 B2 * 6/2003 Quaschner et al. ........... 318/560

FOREIGN PATENT DOCUMENTS

| DE | 39 38 083 A1 | 5/1991 |
| DE | 101 18 477 a1 | 12/2001 |
| EP | 0 685 779 A1 | 12/1995 |
| EP | 0 768 587 | 4/1997 |
| WO | WO 96/12992 | 5/1996 |
| WO | WO 00/42479 | 7/2000 |

* cited by examiner

Primary Examiner—Bentsu Ro
(74) Attorney, Agent, or Firm—Henry M. Feiereisen (57) ABSTRACT

The excitation of an oscillation in a mechanical system, such as a machine element, subjected to a jerk can be suppressed or at least attenuated by rounding a corresponding jerk curve and/or by tuning the stop band of a bandstop filter to the characteristic frequencies of the mechanical system or machine element. In combination, both measures can improve the positioning accuracy while at the same time minimizing excitation of oscillations.

25 Claims, 9 Drawing Sheets

METHOD FOR ADAPTING JERK PROFILES THROUGH JERK LIMITATION FOR MINIMIZING EXCITATIONS OF OSCILLATIONS DURING MOVEMENT OF A MACHINE ELEMENT

CROSS-REFERENCES TO RELATED APPLICATIONS

This application claims the priority of German Patent Application, Serial No. 102 00 680.6, filed Jan. 10, 2002, pursuant to 35 U.S.C. 119(a)–(d), the disclosure of which is incorporated herein by reference.

BACKGROUND OF THE INVENTION

The present invention relates to a method for a jerk-limited speed control of a movable machine element of a numerically controlled industrial processing machine, such as a machine tool, a robot and the like, wherein a travel path of the machine element is subdivided into consecutive travel segments, as well as a corresponding numerical controller.

A mechanical system capable of oscillating (e.g., axes of machine tools) typically has at least one characteristic frequency which is excited during travel and is reflected in the actual position value. An excitation of the mechanism should therefore be prevented or at least reduced.

Jerk limitation is nowadays customarily implemented in speed controls of a numerical controller, e.g., a controller used for a machine tool or a robot. The goal is to reduce loading of the individual axes of the machine without detrimentally affecting the program processing time.

Jerk limitation can delay the buildup of an acceleration in the travel so as to smooth the set point and move the mechanism to minimize the excitation of oscillations.

This smoothing effect of a jerk limitation depends strongly of the desired curve for the set point. Measurements and theoretical investigations have shown that the dynamic range of higher frequency acceleration and braking processes has to be reduced, so that the oscillatable mechanism is not excited too strongly. This dependence holds both for short positioning processes as well as for controlling the entire travel path.

In conventional systems, this problem is addressed by setting small jerk and acceleration limit values, so that high-frequency changes in the path velocity do not strongly excite the oscillations. Disadvantageously, the small preset dynamic values frequently prevent a higher path velocity and hence a shorter program processing time.

A conventional method for attaining a velocity profile with reduced wear on the machine utilizes jerk limitation. For example, in phase 1, the acceleration is set to a maximum value. In phase 2, a constant acceleration is maintained so that the velocity increases linearly. In phase 3, the acceleration is decreased. The term acceleration herein also includes a negative acceleration (braking).

At the end of phase 3, the path velocity reaches a maximum, wherein this velocity is maintained in phase 4. In additional phases 5 to 7, the velocity is decreased in an analogous fashion, so that the path velocity at a set position becomes zero. For this purpose, a negative acceleration is built up in phase 5, which is kept constant in phase 6 and then decreases to zero in phase 7. The slope of the acceleration in phases 1, 3, 5 and 7 is critical for the jerk of a machine. The velocity curve in these phases can be described by a polynomial, whereas in the other phases the velocity is a linear function of time or constant.

Figure 1:
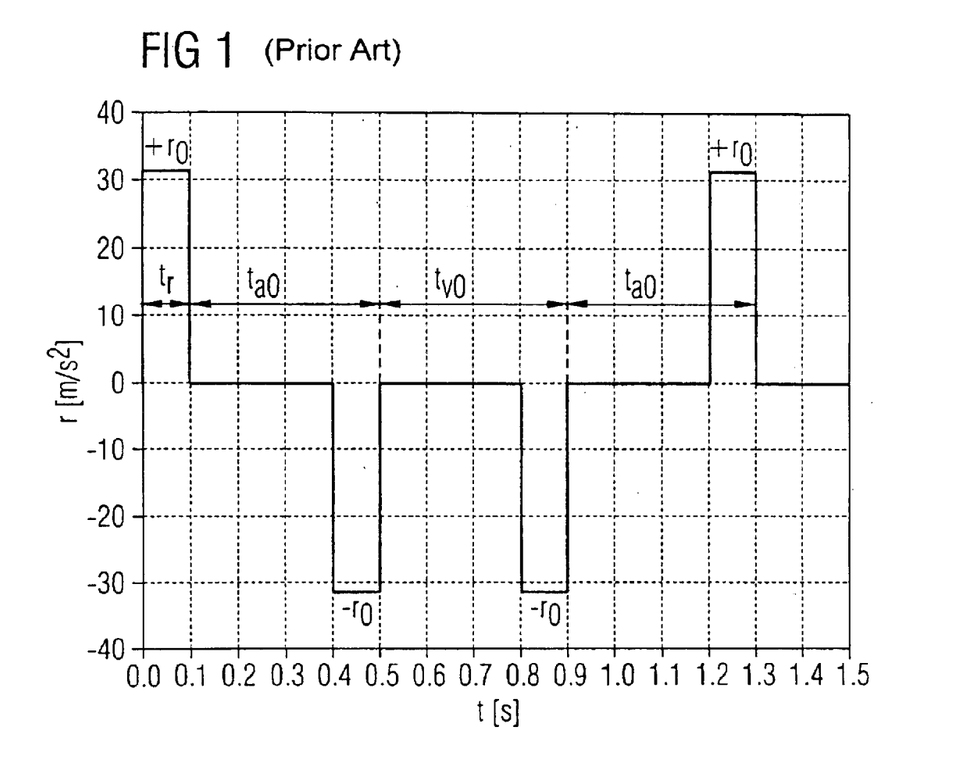
FIG. 1 shows a rectangular jerk profile r as a function of time t in a conventional jerk limitation.

So far, the time dependence of the jerk r(t) can be represented by constant basic shapes in the form of rectangles. FIG. 1 depicts the time dependence of a jerk as a function of the times $t_r$, $t_{a0}$ and $t_{v0}$, which are the time intervals corresponding to the jerk r, the phase with a constant acceleration a, and the travel with a constant velocity v. The jerk r(t) is either equal to zero or equal to a maximum allowable value $r_0$ which can have a positive or negative sign: $r(t)r(t)\epsilon\{0,+r_0,-r_0\}$.

This type of jerk limitation, depending on the way it is implemented, typically prolongs the program processing time in comparison to a velocity control where the acceleration is limited. A shorter processing time may be achievable if a larger acceleration value can be set for the machine within the jerk limit values.

As mentioned above, however, such highly dynamic acceleration and braking processes along the path can disadvantageously excite mechanical oscillations in certain frequency ranges. The dynamics of such processes should therefore be adapted to the machine characteristics.

It would therefore be desirable and advantageous to provide an improved method and system that limit jerk so that critical resonance frequencies of a machine or a movable machine element are not excited.

SUMMARY OF THE INVENTION

According to one aspect of the present invention, a method for a jerk-limited speed control of a movable machine element of a numerically controlled industrial processing machine, such as a machine tool, a robot and the like, includes subdividing a travel path of the machine element into consecutive travel segments, determining a jerk profile for each of the travel segments, and adapting the jerk profiles by a jerk limitation provided by a filtering action through bandstop filters having blocking frequencies, wherein the blocking frequencies coincide substantially with at least a selected number of characteristic frequencies of the movable machine element.

According to another aspect of the invention, a numerical controller for a jerk-limited speed control of a movable machine element of a numerically controlled industrial processing machine, such as a machine tool, a robot and the like, includes an interpolator for subdividing a travel path of the machine element into consecutive travel segments. The controller further includes a filter having a filtering function in form of a bandstop filter, with the bandstop filter adapting jerk profiles by a jerk limitation so that blocking frequencies of the bandstop filter coincide substantially with at least a selected number of characteristic frequencies of the movable machine element.

According to an advantageous feature of the present invention, at least one of the parameters jerk, acceleration and velocity is preset so as to adapt the jerk profile to the blocking frequencies. The jerk profile can include a rectangular jerk curve, wherein different constant jerk values are defined for the rectangular jerk curve for adapting the frequencies of the bandstop filter. In still another embodiment, for adapting the frequencies of the bandstop filter, the shape of the jerk profile is changed by predefining a corresponding shape function for a jerk value of the jerk profile.

According to another advantageous feature of the present invention, the jerk profile can changed by rounding a rectangular jerk curve. This can be done effectively by rounding the rectangular jerk profile with a harmonic function, in particular the square of a sine function ($\sin^2$).

The length of the travel path can remain unchanged by changing the shape of the jerk profile for the same jerk duration so that the area of the jerk profile after the change in the shape of the jerk profile corresponds to the area of the jerk profile before the change of the shape. For the case of a rectangular jerk profile and for the same jerk duration, the maximum jerk value of the jerk profile having the changed shape is increased until the area of the jerk profile is equal to the area of the rectangular jerk curve.

According to another advantageous feature of the present invention, the jerk profiles are determined in advance over several sets of the travel segments on the travel path of the machine element for adapting the jerk profiles.

According to yet another advantageous feature of the present invention, the machine element can have a plurality of axes, wherein the jerk profile can be adapted separately for each axis subject to a jerk by analyzing a corresponding axial velocity curve based on an assumed constant path velocity of the machine element. Advantageously, axial jerk profiles can be determined in advance over several sets of the travel segments on the travel path of the machine element, wherein each segment is defined by a minimum or a maximum on the axial velocity curve.

According to yet another advantageous feature of the present invention, the jerk limitation may be implemented as a digital filter which supplies at each operating point of the machine element an associated controlled jerk value.

The aforedescribed intended adaptation of the jerk curve prevents excitation of resonances. The dynamic limit values can hence also be increased, thereby improving the program processing time.

The aforedescribed jerk limitation according to the invention results, i.a., in the following advantages.

Substantially reduced excitation of oscillations during travel over the same path in the same time. As a result, machine tools travel more softly and more accurately during surface machining and profile cutting, and the quality is also improved.

Faster travel for the same oscillation excitation with a greater permissible jerk. For machine tools, this speeds up machining while maintaining the same quality, increases the output of manufactured parts over the same time period, and improves efficiency.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way.

Figure 2:
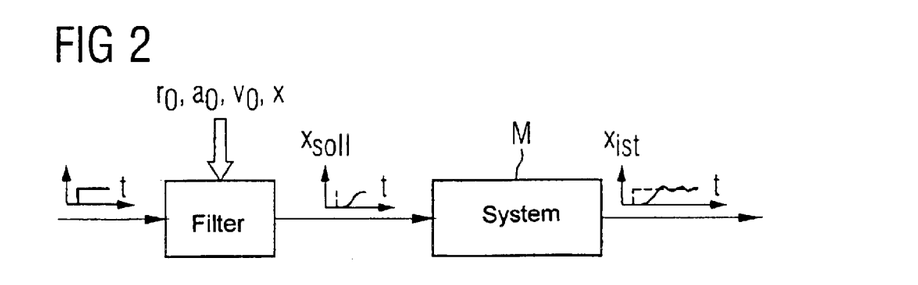
FIG. 2 shows a system capable of oscillations with a jerk-limited set point and an oscillating actual position value.

FIG. 2 shows a system M capable of oscillations with a jerk-limited set point $x_{soll}$ and an oscillating actual position value $x_{ist}$. A jerk-equivalent filter with the frequency response A(f) is calculated, wherein the filter can be determined independent of the limit values (e.g., maximum velocity $v_0$). This filter can be used to describe the excitation of the oscillatory system over the entire frequency range.

Figure 3:
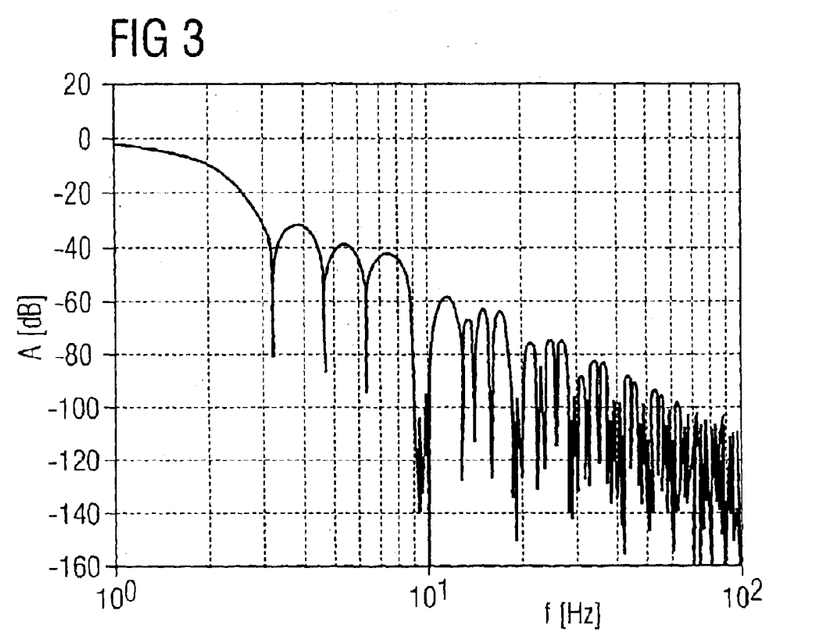
FIG. 3 shows schematically the filter effect of a jerk limitation for a constant rectangular jerk curve.

The filter effect of the jerk limitation was systematically analyzed and optimized according to the invention. The filter effect can be determined from the time dependence of the jerk r. FIG. 3 illustrates the filter effect for a constant rectangular jerk curve by plotting the corresponding amplitude values A as a function of the frequency f. The filter effect of the jerk limitation can then be determined for an arbitrary mechanical system.

Systematic measures according to the invention for minimizing to the oscillation excitation can be implemented by using a jerk-equivalent filter to analyze the jerk limitation. These measures which will now be described represent a substantial improvement over the relatively simple conventional jerk limiters.

Limiting the jerk alone is not sufficient to minimize the excitation of oscillations. The filter effect should be taken into account when judging the time dependence of the jerk limitation. Improvements in the oscillation excitation can be achieved in different ways.

The first measure according to the invention is directed to an intentional adaptation of the parameters jerk, acceleration and velocity.

Figure 4:
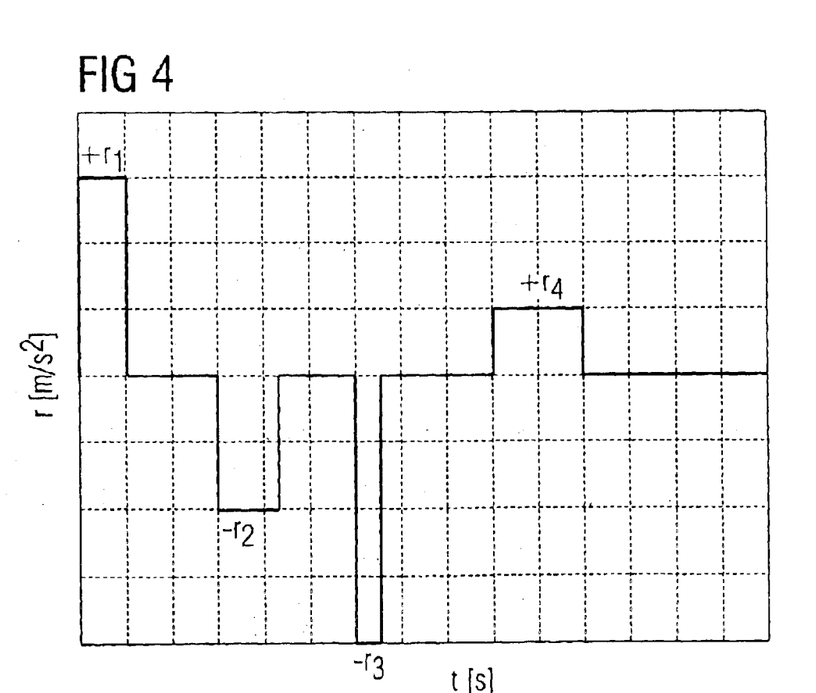
FIG. 4 shows a jerk profile with different jerk values according to the invention for a rectangular jerk curve.
Figure 5:
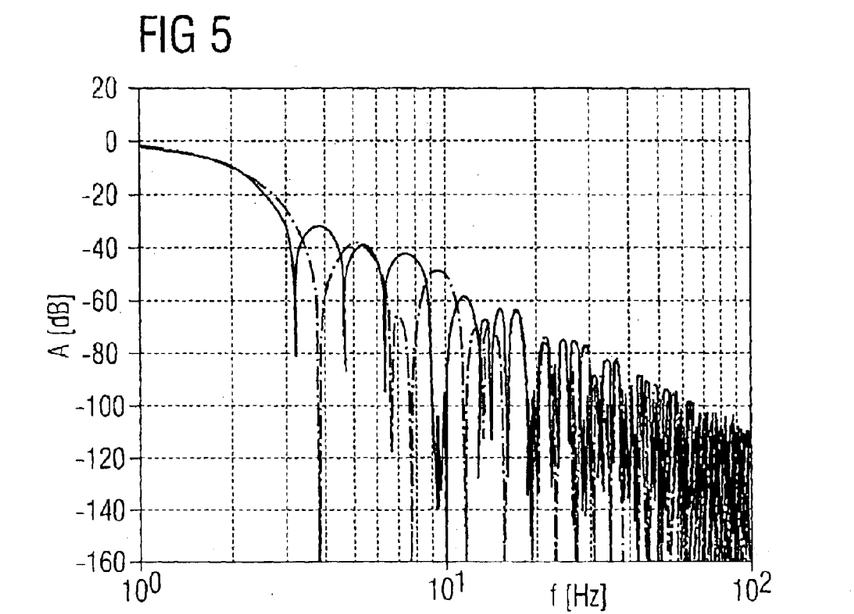
FIG. 5 shows the influence of different jerk values on the bandstop filters of the jerk-limiting filter by comparing the filter effect with a constant jerk and with different jerk values.

The diagram according to FIG. 4 shows different jerk values for a rectangular jerk curve r. The jerk function can be constructed with different, constant jerk values $r_1$ to $r_4$. The different jerk values can through the filter effect directly affect the amplitude reductions A, which operate as bandstop filters (see FIG. 5). FIG. 5 shows the impact of different jerk values on the bandstop filters of the jerk-limiting filter by comparing the filter action with a constant jerk (continuous curve) with different jerk values (dash-dotted line).

The jerk values $r_1$ to $r_4$ can be adjusted and/or the maximum acceleration $a_0$ and the maximum velocity $v_0$ can be adapted, thereby changing the effectiveness of the bandstop filters at the characteristic frequencies of the oscillating system. The damping effect is optimal when the frequencies of the bandstop filters coincide with the characteristic frequencies of the system. This is an improvement over the situation where only the maximum jerk $r_0$ is uniformly varied and tuned to the lowest characteristic frequency of the mechanical system in order to prevent the excitation of oscillations.

Another measure according to the invention involves changing the shape of the jerk function.

Figure 6:
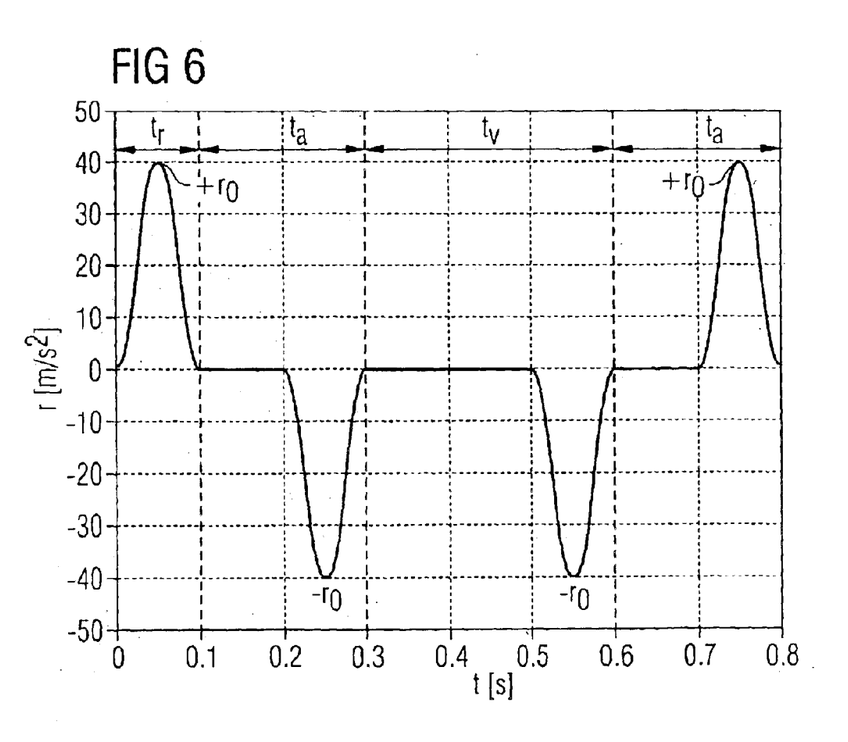
FIG. 6 shows shape change of the jerk curve according to the invention by rounding the rectangular shape.

The filter effect can be optimized by using so-called shape functions for the jerk instead of the rectangular jerk curve. The shape functions which are limited in time to the jerk window, can have any shape. The filter effect can be tailored by differently rounding the jerk function. FIG. 6 shows a shape change of the jerk curve by rounding the rectangular shape having a uniform maximum jerk $r_0$.

If the maximum jerk value $r_0$ for a rounded jerk is identical to that of a rectangular jerk curve, then the acceleration and velocity increases and decreases more slowly, which shortens the travel path for the same time. To satisfy the requirement that the travel path is the same for a rounded jerk curve as for a rectangular jerk curve, the maximum jerk value for the rounded curve $r_{0\_rund}$ is increased so that the area over the jerk window $t_r$ is identical to the value $r_0 * t_r$ for the rectangular curve. In this case, the same acceleration and velocity are obtained.

The significant improvements that can be achieved by utilizing shape functions with the jerk window are shown with reference to FIGS. 7 to 10 for a jerk rounded with a $\sin^2$-function. With the $\sin^2$ shape function, the maximum jerk value $r_0$ is doubled if the same distance is to be traveled during the same jerk time $t_r$.

Figure 7:
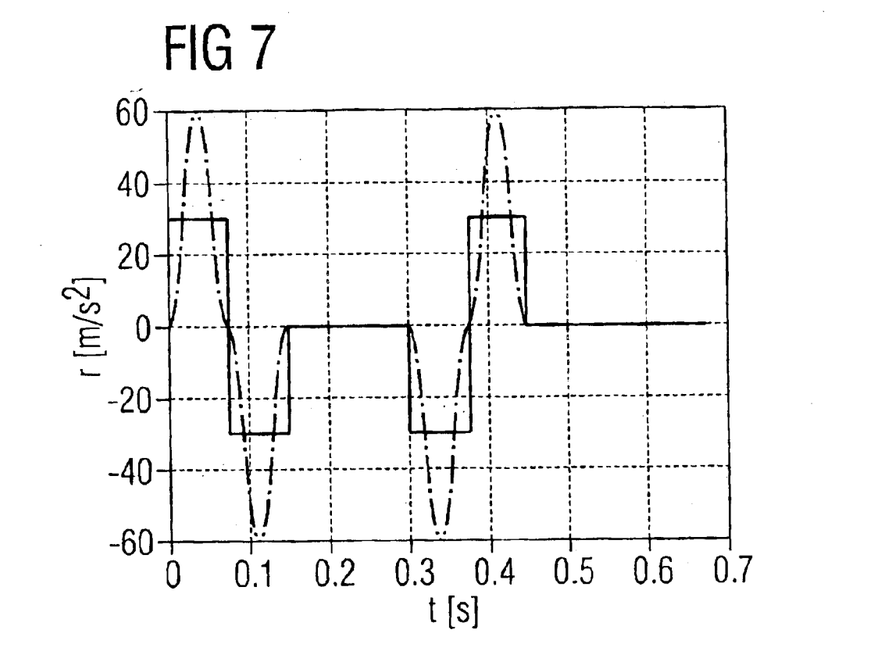
FIG. 7 shows a jerk curve r based on a comparison of a conventional rectangular jerk and a doubling of the maximum jerk value of a jerk curve rounded with a $\sin^2$-function for attaining the same acceleration, velocity and the same distance.
Figure 8:
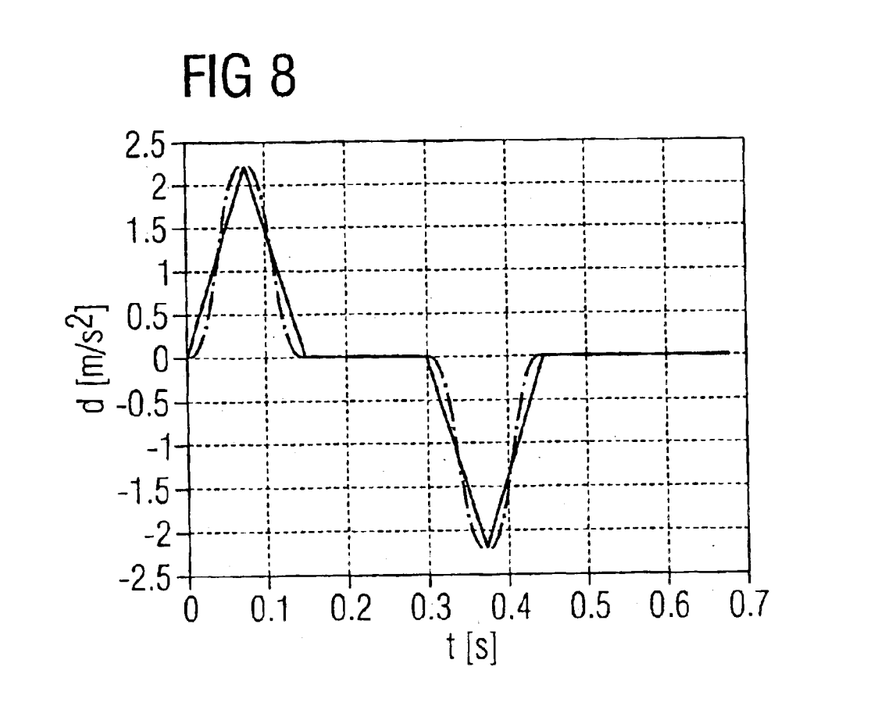
FIG. 8 shows the acceleration curve a associated with FIG. 7.
Figure 9:
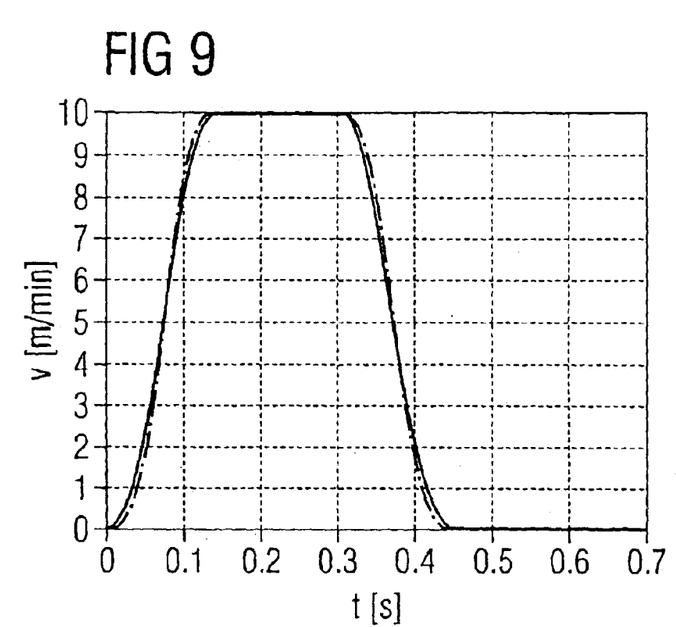
FIG. 9 shows the velocity curve v associated with FIG. 7.
Figure 10:
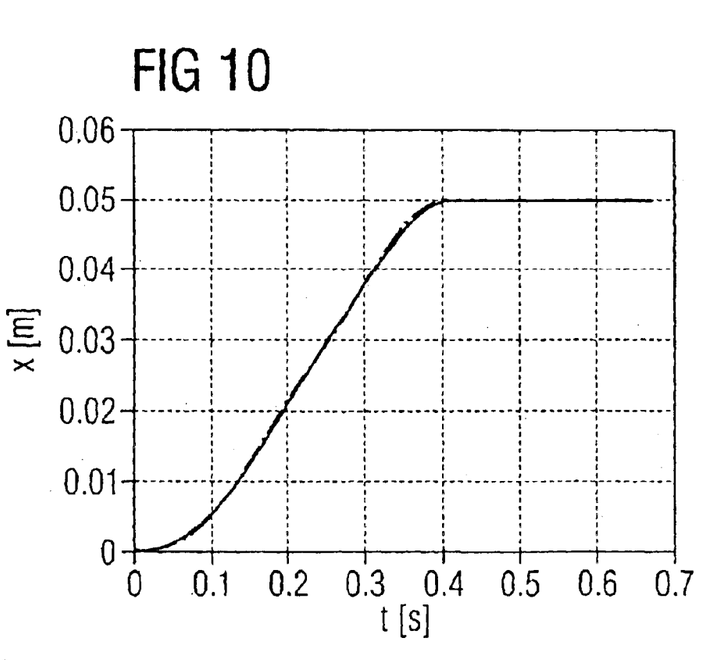
FIG. 10 shows the distances x associated with FIG. 7.

FIG. 7 shows a jerk curve r by comparing a conventional rectangular jerk (continuous curve) with the doubled maximum jerk value of the of a jerk curve rounded with a $\sin^2$ function (dash-dotted), which yields the same acceleration, velocity and the same travel distance. FIG. 8 shows the acceleration curve a corresponding to FIG. 7, FIG. 9 shows the velocity curve v corresponding to FIG. 7, and FIG. 10 shows the travel distances x corresponding to FIG. 7.

Figure 11:
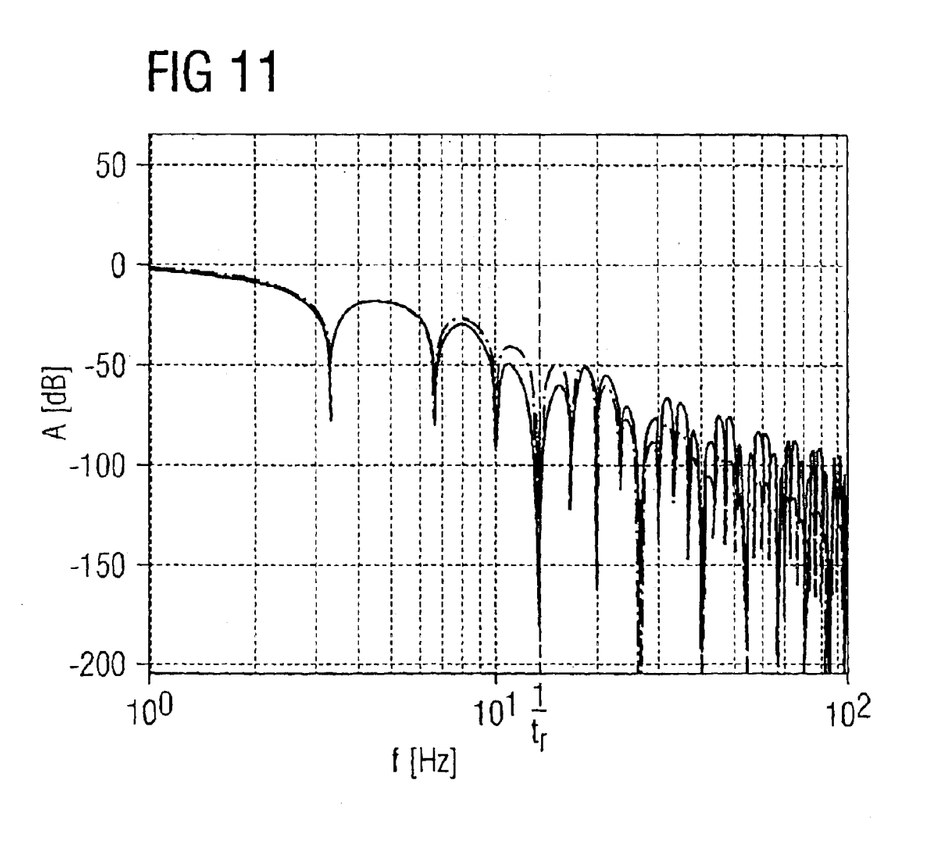
FIG. 11 shows the filter effect of the jerk curve rounded with a $\sin^2$-function in comparison with a rectangular curve.
Figure 12:
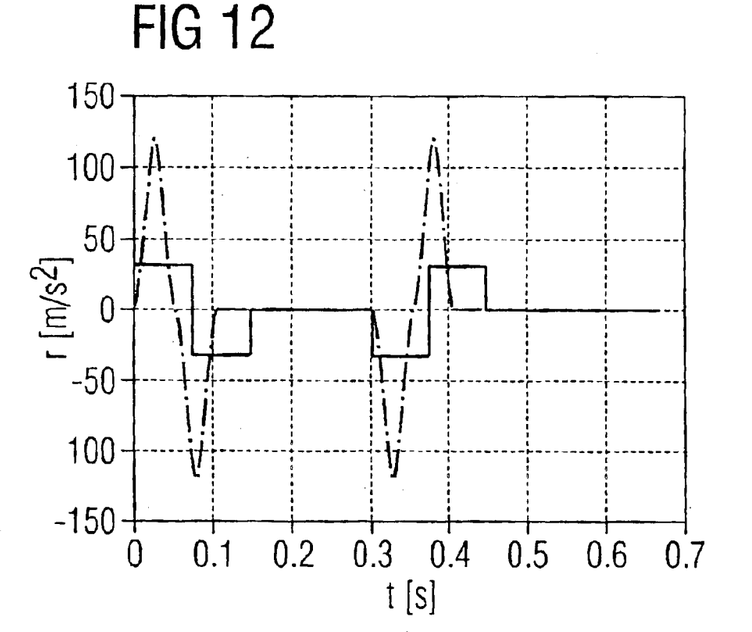
FIG. 12 shows a comparison of a conventional rectangular jerk curve and a jerk curve rounded with a $\sin^2$-function for the same oscillation excitation at 32 Hz.
Figure 13:
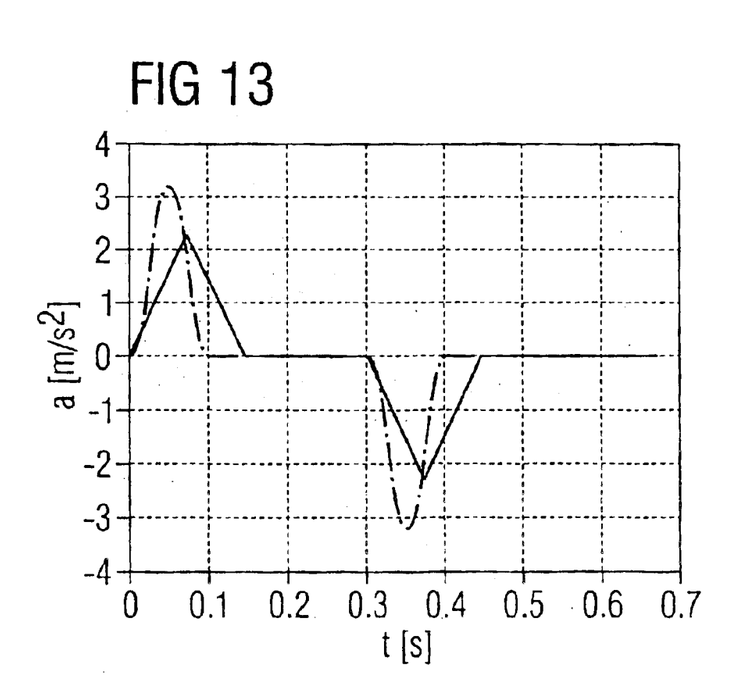
FIG. 13 shows the acceleration curve a associated with FIG. 12.
Figure 14:
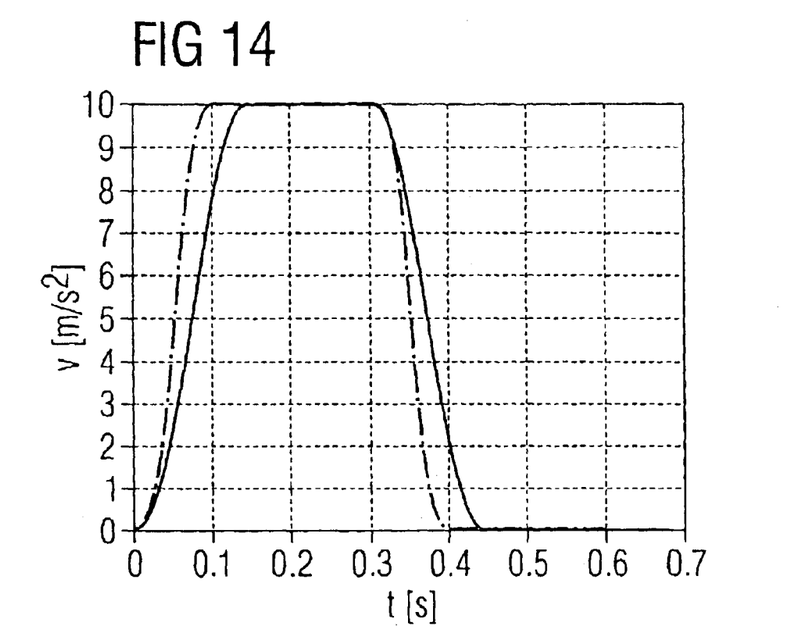
FIG. 14 shows the velocity curve v associated with FIG. 12.
Figure 15:
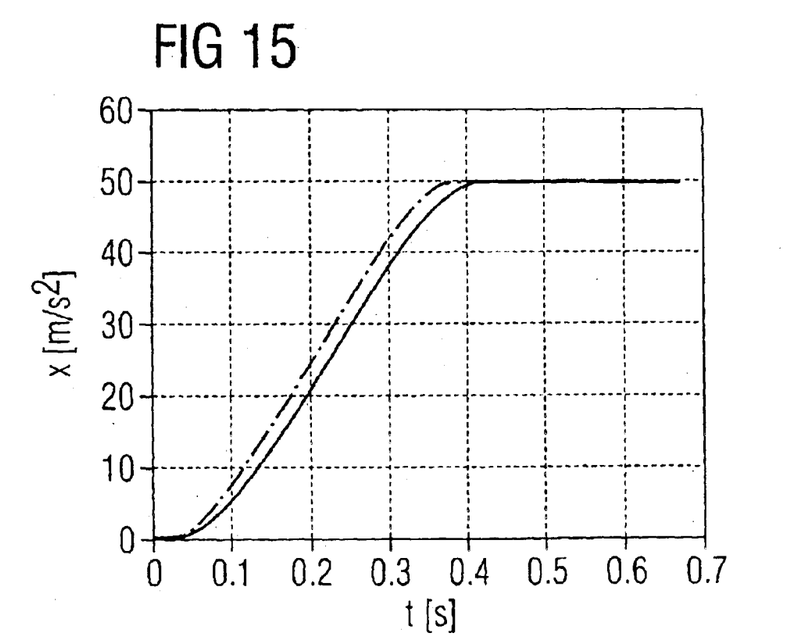
FIG. 15 shows the distances x associated with FIG. 12.

FIG. 11 illustrates the filter effect of the jerk curve rounded with a $\sin^2$ function as compared to the rectangular curve, which is an indication of the vulnerability to oscillation excitations. The shape of the two filters is similar, which is due to the identical travel times $t_r$, $t_a$, and $t_v$, except for the difference in the amplitudes. The decrease in amplitude of the jerk curve rounded with a $\sin^2$ function of 40 dB/decade is greater than that of the rectangular jerk curve above a frequency $f=\sqrt{2}/t_r$. Accordingly, the oscillation excitation for a jerk curve rounded with a $\sin^2$ function is substantially smaller for frequencies greater than $\sqrt{2}/t_r$ Hz. The further the characteristic frequency of the oscillating mechanism is removed from this frequency, the greater the difference. For example, the difference in FIG. 11 is approximately a factor of 5 for an oscillation excitation at 30 Hz.

After having considered that the same distance should be traveled during the same time, the requirement of an identical oscillation excitation for a rectangular jerk curve and a jerk curve rounded with a $\sin^2$ function will now be evaluated. FIGS. 12 to 15 show, in analogy to FIGS. 7 to 10, a comparison of the travel profiles for a rectangular jerk curve and a jerk curve rounded with a $\sin^2$ function for the same oscillation excitation at 32 Hz.

Figure 16:
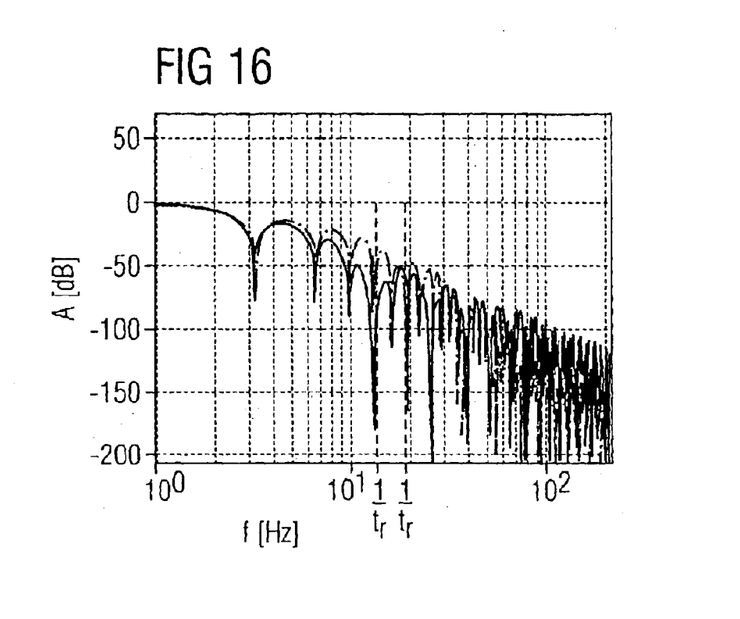
FIG. 16 shows the same filter effect of the rectangular and the jerk curve rounded with a $\sin^2$-function at 32 Hz.

A significant the larger jerk can be employed with a curve rounded with a $\sin^2$ function for the same oscillation excitation at 32 Hz. As a result, the travel time for the jerk curve rounded with a $\sin^2$ function is significantly reduced. In this example, where the velocity reaches a limit value, the time savings amount to approximately 15%. If the velocity does not reach limit value, then rounding with the $\sin^2$ function provides an even greater time advantage in comparison to the rectangular curve. The times $t_r$, $t_{a0}$ and $t_{v0}$ for the two travel profiles are now different. The filter effect with the same oscillation excitation is illustrated in FIG. 16 for the rectangular jerk curve and the jerk curve rounded with a $\sin^2$ function.

According to the invention, the shape of the jerk function can be changed by adapting to the parameters jerk, acceleration and velocity.

Figure 17:
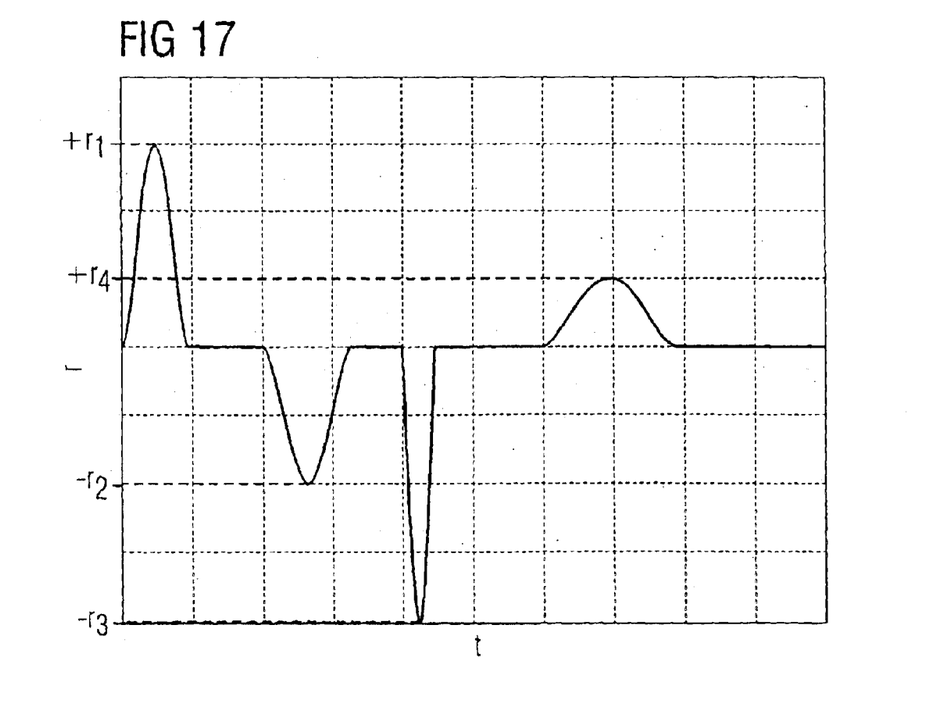
FIG. 17 shows a shape change of the jerk function according to the invention with different jerk values.

The different exemplary embodiments for improving the oscillation excitation described above can also be used in combination, which enhances the effect of attaining a position without exciting oscillations. By combining the two approaches, an improved filter effect can be achieved by rounding the jerk curve in general and by intentionally tuning the jerk-equivalent filter to the characteristic frequencies of the mechanical system through application of different jerk values $r_1$ to $r_4$ to the bandstop filters, thereby further enhancing the filter effect. Rounding of the jerk function with different jerk values is illustrated in FIG. 17.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A control method for a jerk-limited speed control of a movable machine element of a numerically controlled industrial processing machine, comprising the steps of:
   subdividing a travel path of the machine element into consecutive travel segments;
   determining a jerk profile for each of the travel segments; and adapting the jerk profiles by a jerk limitation provided by a filtering action through bandstop filters having blocking frequencies,
   wherein the blocking frequencies coincide substantially with at least a selected number of characteristic frequencies of the movable machine element.

2. The control method of claim 1, wherein at least one of the parameters jerk, acceleration and velocity is preset so as to adapt the jerk profile to the blocking frequencies.

3. The control method of claim 2, wherein the jerk profile comprises a rectangular jerk curve, and wherein different constant jerk values are defined for the rectangular jerk curve for adapting the frequencies of the bandstop filter.

4. The control method of claim 1, wherein for adapting the frequencies of the bandstop filter, the shape of the jerk profile is changed by predefining a corresponding shape function for a jerk value of the jerk profile.

5. The control method of claim 4, wherein the jerk profile is changed by rounding a rectangular jerk curve.

6. The control method of claim 5, wherein the rectangular jerk curve is rounded by using a harmonic function.

7. The control method of claim 6, wherein the harmonic function is a sine square ($\sin^2$) function.

8. The control method of claim 5, wherein for the same jerk duration, the shape of the jerk profile is changed in such a way that the area of the jerk profile after the change in the shape of the jerk profile corresponds to the area of the jerk profile before the change of the shape.

9. The control method of claim 8, wherein for the same jerk duration, the maximum jerk value of the jerk profile having the changed shape is increased until the area of the jerk profile is equal to the area of the rectangular jerk curve.

10. The control method of claim 1, and further comprising the step of determining the jerk profiles in advance over several sets of the travel segments on the travel path of the machine element for adapting the jerk profiles.

11. The control method of claim 1, wherein the machine element comprises a plurality of axes, and wherein the jerk profile is adapted separately for each axis subject to a jerk by analyzing a corresponding axial velocity curve based on an assumed constant path velocity of the machine element.

12. The control method of claim 11, and further comprising the step of determining the axial jerk profiles in advance over several sets of the travel segments on the travel path of the machine element, wherein each segment is defined by a minimum or a maximum on the axial velocity curve.

13. A numerical controller for a jerk-limited speed control of a movable machine element of a numerically controlled industrial processing machine, comprising:

an interpolator for subdividing a travel path of the machine element into consecutive travel segments; and a filter having a filtering function in form of a bandstop filter, said bandstop filter adapting jerk profiles by a jerk limitation so that blocking frequencies of the bandstop filter coincide substantially with at least a selected number of characteristic frequencies of the movable machine element.

14. The numerical controller of claim 13, wherein at least one of the parameters jerk, acceleration and velocity is preset so as to adapt the jerk profile to the blocking frequencies.

15. The numerical controller of claim 14, wherein the jerk profile comprises a rectangular jerk curve, and wherein different constant jerk values are defined for the rectangular jerk curve for adapting the frequencies of the bandstop filter.

16. The numerical controller of claim 15, wherein for the same jerk duration, a maximum jerk value of the jerk profile having the changed shape is increased until an area of the jerk profile is equal to an area of the rectangular jerk curve.

17. The numerical controller of claim 13, wherein for adapting the frequencies of the bandstop filter, the shape of the jerk profile is changed by predefining a corresponding shape function for a jerk value of the jerk profile.

18. The numerical controller of claim 17, wherein the jerk profile is changed by rounding a rectangular jerk curve.

19. The numerical controller of claim 18, wherein for the same jerk duration, a maximum jerk value of the jerk profile having the changed shape is increased until an area of the jerk profile is equal to an area of the rectangular jerk curve.

20. The numerical controller of claim 17, wherein for the same jerk duration, the shape of the jerk profile is changed in such a way that the area of the jerk profile after the change in the shape of the jerk profile corresponds to the area of the jerk profile before the change of the shape.

21. The numerical controller of claim 17, wherein the jerk profile is changed by rounding a rectangular jerk vurve with a harmonic function.

22. The numerical controller of claim 13, wherein for adapting the jerk profiles, the jerk profiles are determined in advance over several sets of the travel segments on the travel path of the machine element.

23. The numerical controller of claim 13, wherein the machine element comprises a plurality of axes, and wherein the jerk profile is adapted separately for each axis subject to a jerk by analyzing a corresponding axial velocity curve based on an assumed constant path velocity of the machine element.

24. The numerical controller of claim 23, wherein axial jerk profiles are determined in advance over several sets of the travel segments on the travel path of the machine element, with each segment being defined by a minimum or a maximum on the axial velocity curve.

25. The numerical controller of claim 13, wherein the jerk limitation is implemented as a digital filter which supplies an corresponding preset jerk value at each operating point of the machine element.

* * * * *